(12) United States Patent
Eguchi

(10) Patent No.: US 8,953,206 B2
(45) Date of Patent: Feb. 10, 2015

(54) IMAGE FORMING APPARATUS, WHICH IS CONNECTED TO A SERVER THAT PROVIDES A SERVICE OVER A NETWORK AND FORMS AN IMAGE USING A MICROBLOGGING FUNCTION PROVIDED BY THE SERVER, CONTROL METHOD AND STORAGE MEDIUM

(71) Applicant: Canon Kabushiki Kaisha, Tokyo (JP)

(72) Inventor: Kimimori Eguchi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/749,630

(22) Filed: Jan. 24, 2013

(65) Prior Publication Data

US 2013/0215460 A1 Aug. 22, 2013

(30) Foreign Application Priority Data

Feb. 16, 2012 (JP) ................................. 2012-032037

(51) Int. Cl.
*G06F 3/12* (2006.01)
*G06K 15/00* (2006.01)
*G06K 15/02* (2006.01)

(52) U.S. Cl.
CPC .............. *G06K 15/02* (2013.01); *G06K 15/405* (2013.01); *G06K 15/1806* (2013.01); *G06F 3/1204* (2013.01); *G06F 3/1206* (2013.01); *G06F 3/1268* (2013.01); *G06F 3/1288* (2013.01)
USPC ........................... 358/1.15; 358/1.1; 358/1.14

(58) Field of Classification Search
USPC ......... 358/1.15, 1.1, 1.14; 714/39, 47.1, 47.3; 709/223, 224, 225, 206, 229, 238, 245, 709/237, 234; 715/200, 234, 259, 243, 758, 715/751, 752, 760, 747, 746, 733, 736, 737, 715/740, 741
See application file for complete search history.

(56) References Cited

U.S. PATENT DOCUMENTS

| | | | | |
|---|---|---|---|---|
| 8,549,140 | B2 * | 10/2013 | Chernaik et al. .............. | 709/224 |
| 2012/0072835 | A1 * | 3/2012 | Gross et al. ................... | 715/243 |
| 2012/0154854 | A1 * | 6/2012 | Sato ............................. | 358/1.15 |

FOREIGN PATENT DOCUMENTS

JP 7-261953 A 10/1995

* cited by examiner

*Primary Examiner* — Ngon Nguyen
(74) *Attorney, Agent, or Firm* — Fitzpatrick, Cella, Harper & Scinto

(57) ABSTRACT

On a Web service apparatus, messages are monitored and obtained. The contents of an obtained message are analyzed, and if it is determined that the message includes a print instruction for a follower, the corresponding file is obtained from the Web service apparatus, printed, and after the print completes, a comment relating to the print is sent to the Web service apparatus.

11 Claims, 16 Drawing Sheets

| | 901 | 902 | 903 |
|---|---|---|---|
| | PRINT ID | PRINT NAME | USER ID |
| | 0001 | PROJECT Y DISTRIBUTION MATERIAL Ver 01 | 15304 |
| | 0002 | PROJECT Y RESOURCE MANAGEMENT | 91024 |
| | 0003 | PROJECT Y SCHEDULE MANAGEMENT | 32425 |
| | 0004 | MINUTES 0315 | 12534 |

F I G. 10
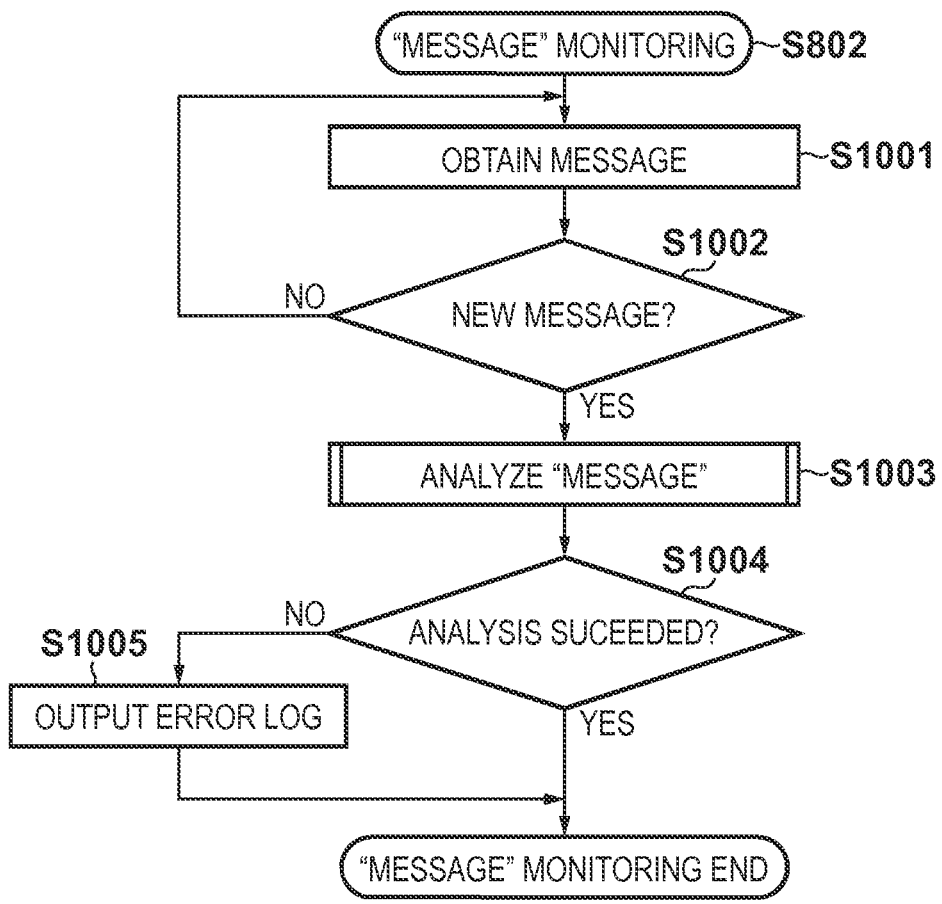

FIG. 12A

| COMMAND STRING | PROCESSING FUNCTION |
|---|---|
| SEND | SEND FUNCTION |
| PRINT | PRINT FUNCTION |
| COPY | COPY FUNCTION |

FIG. 12B

| PROTOCOL STRING | PROCESSING FUNCTION |
|---|---|
| FOR Mr. A | FOLLOWER |
| FOR Mr. B | FOLLOWER |
| FOR Mr. C | FOLLOWER |

FIG. 12C

| PARAMETER STRING | PROCESSING FUNCTION |
|---|---|
| COPIES | COPIES PROCESSING |
| BLACK AND WHITE | BLACK AND WHITE PROCESSING |
| COLOR | COLOR PROCESSING |
| FILE | OBTAIN FROM STORAGE LOCATION |

IMAGE FORMING APPARATUS, WHICH IS
CONNECTED TO A SERVER THAT
PROVIDES A SERVICE OVER A NETWORK
AND FORMS AN IMAGE USING A
MICROBLOGGING FUNCTION PROVIDED
BY THE SERVER, CONTROL METHOD AND
STORAGE MEDIUM

BACKGROUND OF THE INVENTION

1. Field of the Invention

The present invention relates to an image forming apparatus that is connected to a server that provides a service over a network, and forms an image using a microblogging function which is provided by the server, and to a control method and storage medium thereof.

2. Description of the Related Art

In recent years, there have been services that provide microblogging functions as communication tools. A microblogging function is a type of blog function in which users holding accounts of the service post "messages" and "comments" in short sentences called "microposts". The user here is not limited to being an actual user (person) and also includes such things as, for example, image forming apparatuses themselves, linkage services, objects in a cloud service and applications. A unique identifier is assigned to each "message", "comment", etcetera that a user posted or sent. In a microblogging function communication is carried out via a "timeline" and "following". Here, a "timeline" is a user specific Web page for registering/displaying/managing, as a list, such things as "comments" related to "messages" registered by users. Here, the user that registered the "message", and other users, by registering related information as "comments" on the "timeline", exchange information and communicate. Furthermore, "following" is the act of registering so that the messages posted by another user are displayed on a user's own Web page. (hereinafter a user following another person is referred to as a "follower")

Amongst CRM (Customer Relationship Management) services provided as cloud services, there are examples in which a microblogging function to be used as a communication tool during work is provided. In these cloud services, client information, business discussions, etcetera is linked to "messages", "comments", etcetera, in order to further improve the user's convenience of use. Furthermore, at the same time, in the CRM services, file sharing functions in which files are shared between users, wherein the files can be saved, edited, updated, and referenced. An example of this is Chatter provided by Salesforce.com as a microblogging function. Document, File, etcetera are examples of file sharing functions.

Meanwhile, conventionally, techniques are known for searching for an image forming apparatus considered to be optimal out of a plurality of image forming apparatuses, when a print requester wishes to form an image, and using the image forming apparatus considered to be optimal to form the image (see Japanese Patent Laid-Open No. 7-261953).

However, with the conventional technology, there has been a problem when a print requester wishes to print for another user, and select an image forming apparatus that is optimal for the other user. This is because it has been necessary for the print requester to know what image forming apparatus is optimal for the other user. In this way, conventionally, it has been possible, for a print requester, to automatically search for an image forming apparatus that is optimal for the print requester, but if the print requester wishes to print for other users, it has been necessary to register beforehand information, that correlates users and image forming apparatuses, as information for searching for the image forming apparatus that is optimal for the other users. However, providing this kind of information for all users is a considerable burden.

SUMMARY OF THE INVENTION

An aspect of the present invention is to eliminate the above-mentioned problems with the conventional technology.

A feature of the present invention is to provide a technique for selecting an optimal image forming apparatus and requesting a print using the selected image forming apparatus for another user while reducing the burden of a print requester.

According to an aspect of the present invention, there is provided an image forming apparatus capable of communicating with a Web service apparatus having a microblogging function, the image forming apparatus comprising: a monitoring unit configured to monitor the Web service apparatus for a message and obtain the message; a determining unit configured to analyze the contents of the message obtained by the monitoring unit and determine whether the message includes an instruction to print for a follower that follows the image forming apparatus; an obtaining unit configured to obtain a file from the Web service apparatus when the determining unit determines that the message includes the instruction to print for the follower; a printing unit configured to carry out a printing of the file obtained by the obtaining unit; and a communicating unit configured to send a comment related to the printing to the Web service apparatus after the printing by the printing unit finishes.

Further features and aspects of the present invention will become apparent from the following description of exemplary embodiments, with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a flowchart for describing the details of message monitoring processing (step S802) in the image forming apparatus according to the first embodiment of the present invention.

FIG. 12A is a diagram for illustrating an example of a command string management table held in the image forming apparatus.

FIG. 12B is a diagram for illustrating an example of a protocol string table held in the image forming apparatus.

FIG. 12C is a diagram for illustrating an example of a parameter string management table held in the image forming apparatus.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

In a first embodiment, the case where a user A requests a print for a user B will be explained. The user B shall be considered to have registered so that a message posted by an image forming apparatus B that the user B thinks is optimal for the user B is displayed on a Web page of the user B. In other words, the relationship of the user B being a follower of the image forming apparatus B (the user B is following the image forming apparatus B) shall be considered to be in place.

Figure 1:
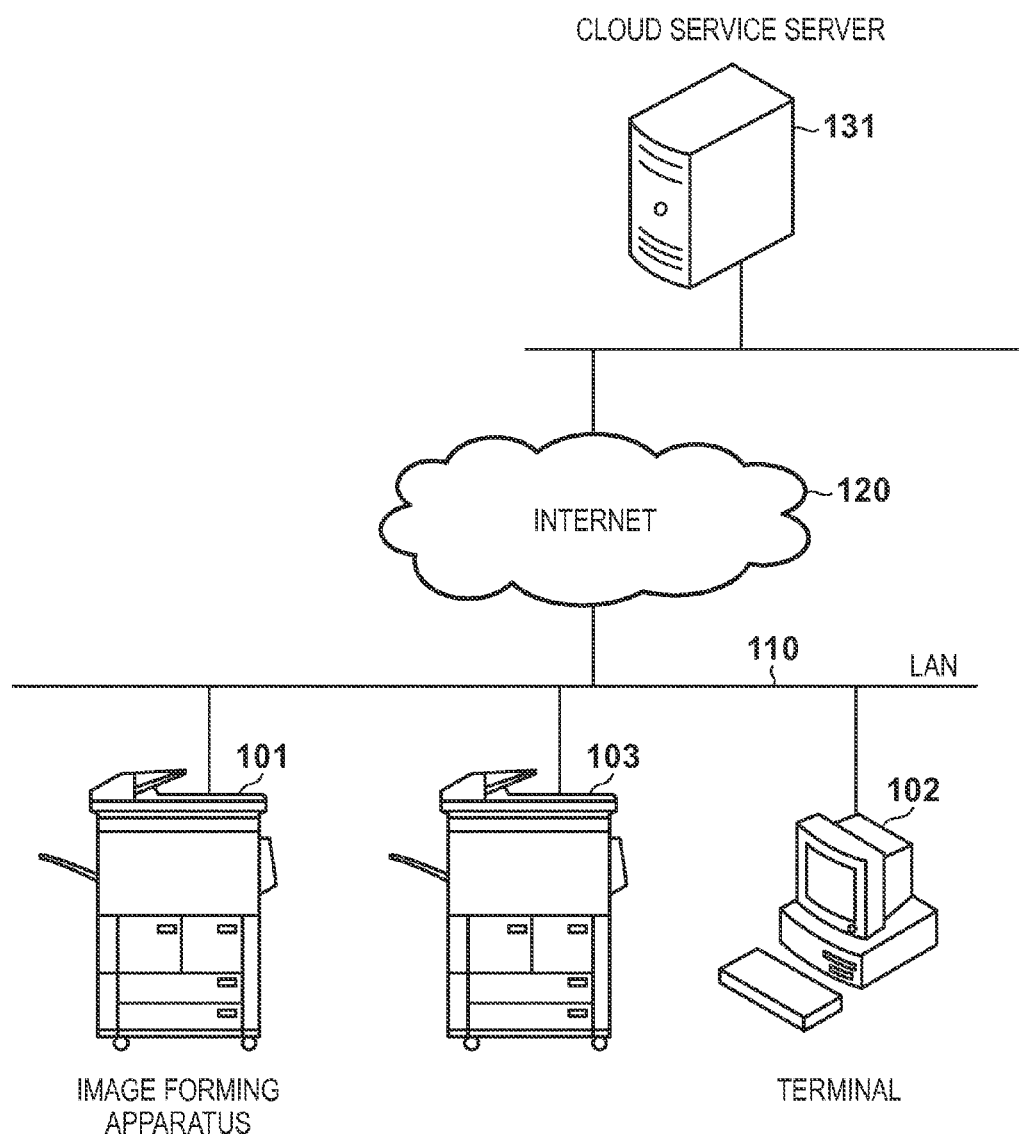
FIG. 1 is an overall view of a system according to a first embodiment of the present invention.

FIG. 1 is an overall view of a system according to a first embodiment of the present invention. An image forming apparatus A 101, an image forming apparatus B 103 and a terminal 102 are connected to a LAN 110. The LAN 110 is connected to the Internet 120, and a service providing cloud service server 131 (Web service apparatus) is also connected to the LAN 110 via the Internet 120. The image forming apparatus A 101 and the image forming apparatus B 103 can communicate with the cloud service server 131 via the LAN 110 and the Internet 120. Here, the terminal 102 is connected to the LAN 110, but the present invention is not limited to this, and it is enough that the terminal 102 can connect to the cloud service server 131. Note, the image forming apparatuses A 101 and B 103 have the same configuration. Furthermore, while in the first embodiment, explanation is made focusing on the operation of the image forming apparatus B 103, the image forming apparatus A 101 is used in the explanation of the hardware configuration and the software configuration of the image forming apparatuses.

Figure 2:
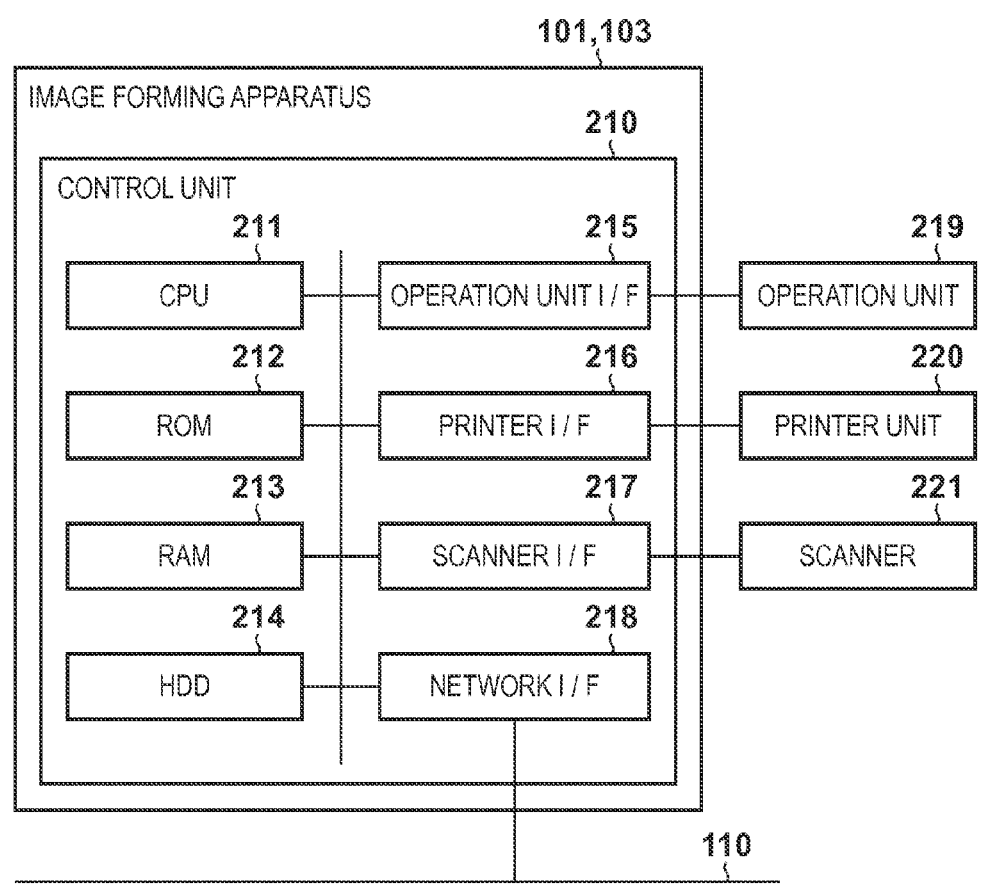
FIG. 2 is a block diagram for illustrating a hardware configuration of an image forming apparatus according to the first embodiment of the present invention.

FIG. 2 is an block diagram for describing a hardware configuration of the image forming apparatus A 101 according to the first embodiment of the present invention.

A control unit 210 including a CPU 211, controls the operation of the image forming apparatus on the whole. The CPU 211 reads out a control program stored in a ROM 212, and carries out various control such as reading control and transmitting control. A RAM 213 is the main memory of the CPU 211, and is used as a temporary storage area such as a work area. In the embodiments described below, there are two image forming apparatuses, A 101 and B 103, but they shall be considered to have the same configuration.

An HDD 214 stores such things as image data, various types of programs and various types of information tables. An operation unit I/F 215 connects an operation unit 219 and the control unit 210. In the operation unit 219, such things as a LCD display unit with a touch panel function, and a keyboard are provided. A printer I/F 216 connects a printer unit 220 and the control unit 210. Data to be printed by the printer unit 220 is transferred from the control unit 210 via the printer I/F 216 and printed, in the printing unit, onto a recording medium. A scanner I/F 217 connects a scanner 221 and the control unit 210. The scanner 221 reads an image on a document, generates image data and inputs the data into the control unit 210 via the scanner I/F 217. A network I/F 218 connects the image forming apparatus to the LAN 110. The network I/F 218 sends image data, information, etcetera to outside apparatuses (for example, the cloud service server 131) via the LAN 110 and the Internet 120, and the network I/F 218 receives various kinds of information over the LAN 110 from outside apparatuses. Note, a program executed by the CPU 211 may be installed in the HDD 214, loaded by a boot program that is stored on the ROM 212 into the RAM 213 and executed.

Figure 3:
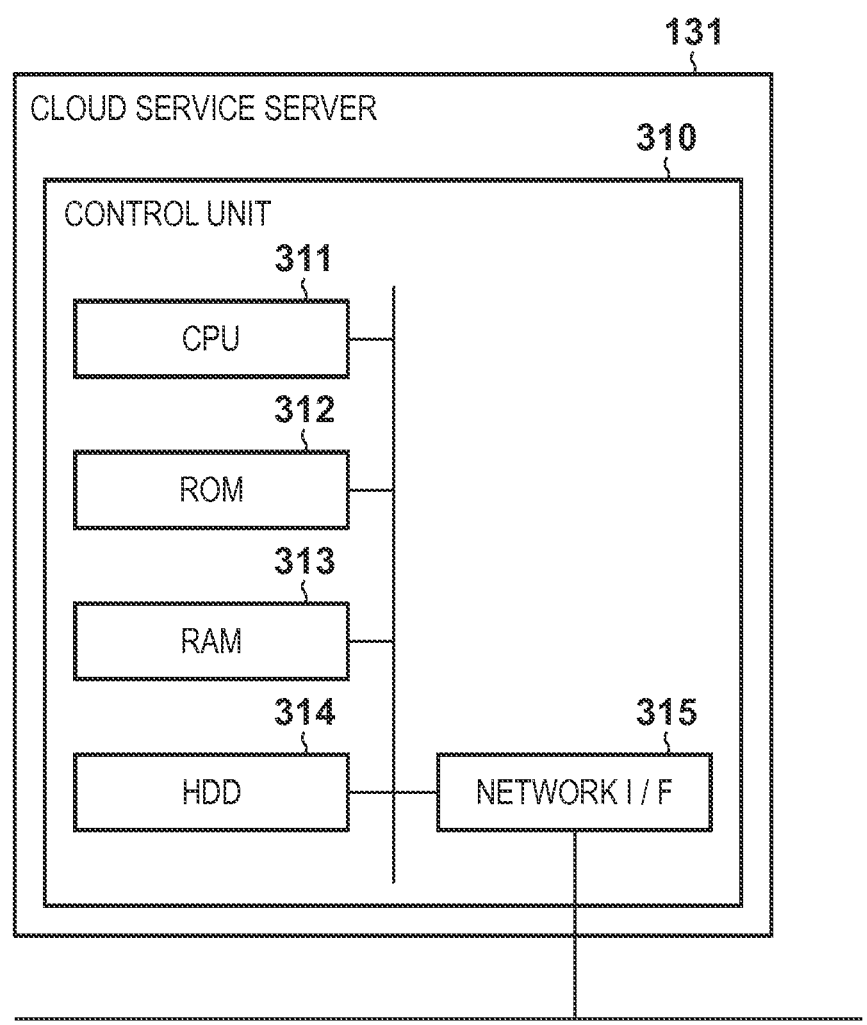
FIG. 3 is a block diagram for illustrating a configuration of a cloud service server according to the first embodiment of the present invention.

FIG. 3 is an block diagram for illustrating a configuration of the cloud service server 131 according to the first embodiment of the present invention.

A control unit 310, that includes a CPU 311, controls the operation of the cloud service server 131 on the whole. The CPU 311, according to a control program loaded into a RAM 313 from an HDD 314 by a boot program stored in a ROM 312, performs various kinds of control processing. The HDD 314 stores such things as image data, various types of programs and various types of information tables described later. A network I/F 315 connects the cloud service server 131 to the Internet 120, and sends various kinds of information to and receives various kinds of information from apparatuses on the LAN 110 via the Internet and the LAN 110.

Note, the terminal 102 in FIG. 1 and the cloud service server 131 explained in FIG. 3 have similar configurations.

Figure 4:
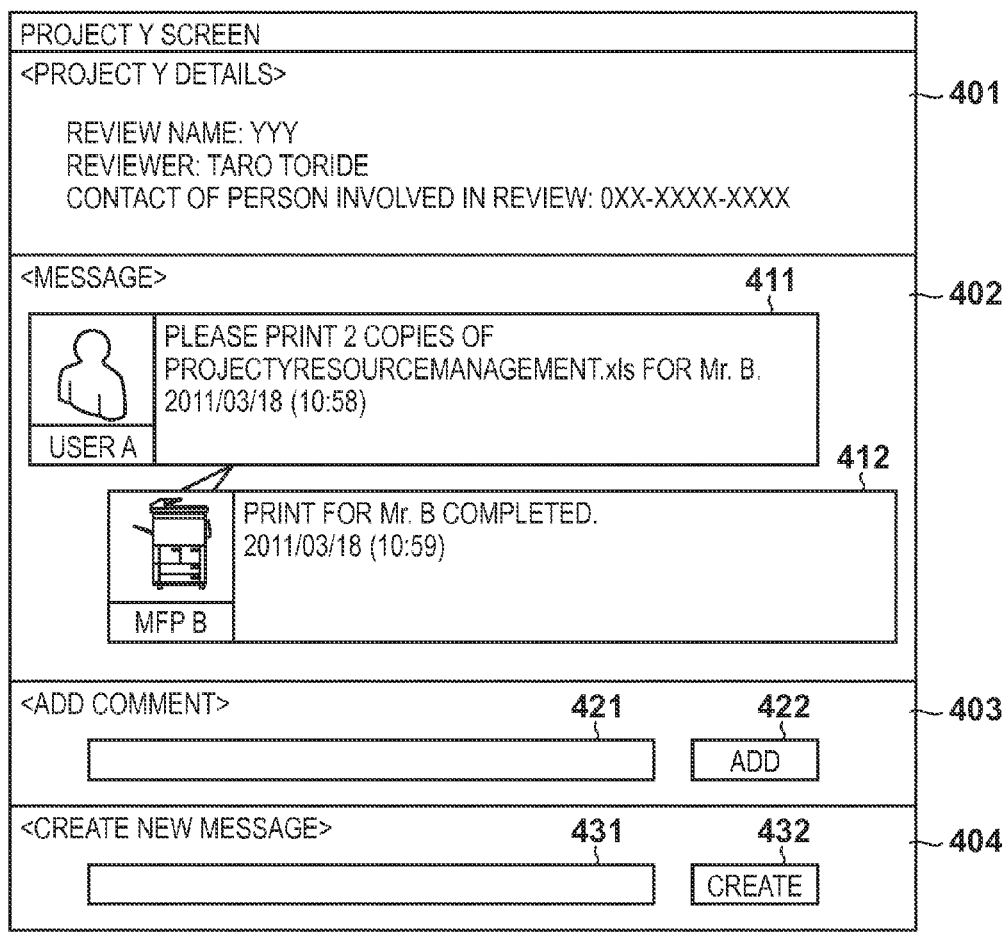
FIG. 4 is a diagram for describing a microblogging function provided by the cloud service server according to the first embodiment of the present invention.

FIG. 4 is a diagram for describing a microblogging function provided by the cloud service server 131 according to the first embodiment of the present invention. FIG. 4 illustrates an example of the display of a Web page that is displayed when, from a browser that operates on the terminal 102 (a PC, mobile device, etcetera), the cloud service server 131 is accessed. Here the cloud service server 131 is managing an ongoing project for the purpose of supporting development, and an example of a screen for project Y displaying information related to the ongoing project is shown.

Numeral 401 denotes a project details area in which information related to project Y (a review name, a reviewer and a contact of a person involved in the review) is displayed. Numeral 402 denotes a message display area, in which messages and comments to those messages are displayed in a timeline. In this message display area 402, a user A has registered a message 411 stating, "PLEASE PRINT 2 COPIES OF PROJECTYRESOURCEMANAGEMENT.XLS FOR MR. B.". Also, the image forming apparatus B (MFP B) has registered a comment 412, "PRINT FOR MR. B COMPLETED." in response to the message 411.

Here, a user B is following the MFP B. Furthermore, the MFP B corresponds to the image forming apparatus B 103 which has the same configuration as the image forming apparatus A 101 and is connected to the LAN 110. Follow relationships are formed by each user following an account of an image forming apparatus that the user thinks is optimal in the microblogging function. Because of this, messages posted by the image forming apparatuses that each user is following are displayed on the respective Web pages of the users. Furthermore, because of the microblogging function, it makes for a system in which this relationship can be directly known. In the case where there is no system through which the side that is followed can know directly which users are following it, for example, when the user B carries out a setting to follow the image forming apparatus B 103, a mail is sent, and the image forming apparatus B 103 is notified that it was followed, and thereby the image forming apparatus B 103 can easily receive information that the user B is following it.

Furthermore, regarding the file to be printed, PROJECTYRESOURCEMANAGEMENT.XLS, it shall be considered that the storage location or link information is provided. The storage location of that file is on the cloud service server 131 or on an outside server, etcetera. Each image forming apparatus (MFP), along with replying, obtains each file to output. Here, an example is given in which an Excel file is output, but such files as a pdf or Word file can also be used.

Numeral 403 denotes a comment input area, and when a user inputs a comment into a comment input box 421, and presses an ADD button 422, an comment creation request is sent from a Web browser to the cloud service server 131. The cloud service server 131, having received this request, registers the comment that was input into the comment input box 421. Because of this, when a user has accessed the cloud service server 131 on a Web browser, registered comments like the previously mentioned comment 412 will be displayed on the Web browser.

Numeral 404 denotes a message input area, and when a user enters a message into a message input box 431, and presses an ADD button 432, a message generation request is sent from the Web browser to the cloud service server 131. The cloud service server 131, having received this request, registers this input message. Because of this, when a user has accessed the cloud service server 131 on a Web browser, generated messages like the previously mentioned message 411 will be displayed on the Web browser.

Figure 5:
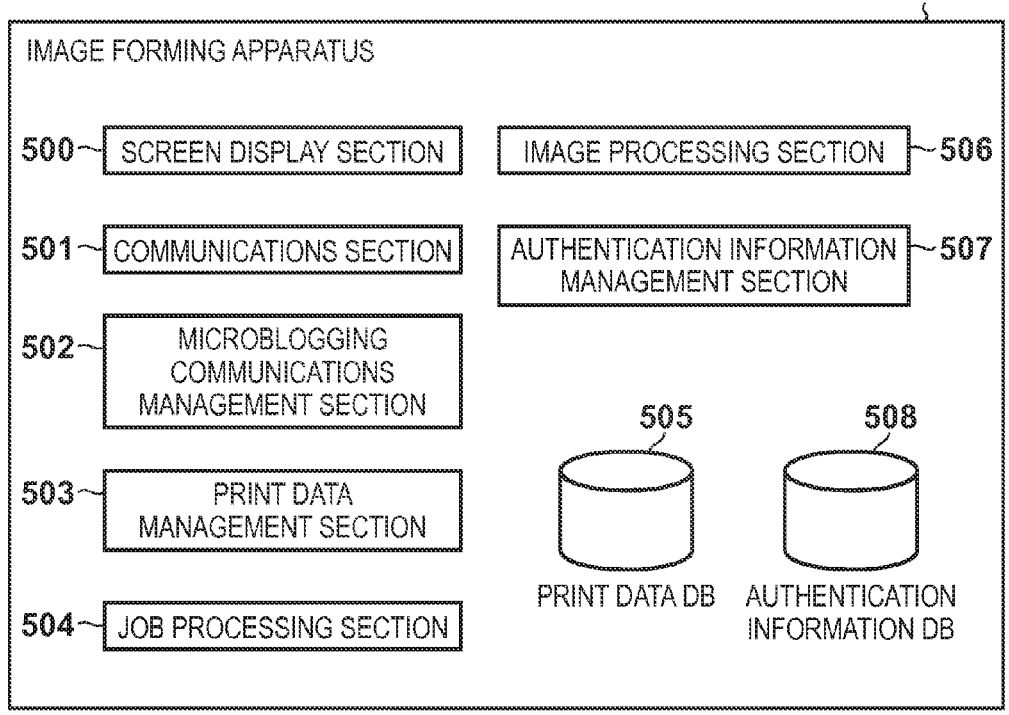
FIG. 5 is a diagram for describing a software configuration of the image forming apparatus according to the first embodiment of the present invention.

FIG. 5 is a diagram for describing a software configuration of the image forming apparatus A 101 according to the first embodiment of the present invention. Each of the functional units shown in FIG. 5 is realized through the execution of control programs by the CPU 211 that each of the image forming apparatuses has.

The image forming apparatus A 101 has a screen display section 500, a communications section 501, a microblogging communications management section 502, a print data management section 503, a job processing section 504, a print data database 505, an image processing section 506, an authentication information management section 507 and an authentication information DB 508. Note, hereinafter the print data database 505 is abbreviated to the print data DB 505. Furthermore, the authentication information management section 507 and the authentication information DB 508 are explained in the second embodiment.

The communications section 501 sends requests to the cloud service server 131 in response to an instruction from the microblogging communications management section 502. Furthermore, the communications section 501 receives a response from the cloud service server 131 (a response to the request).

The microblogging communications management section 502 obtains follow information from the cloud service server 131. Next, the microblogging communications management section 502 monitors for a message on the cloud service server 131 (on the Web service server), and determines whether a request is a print request for a follower. If the request is a print request for a follower, the microblogging communications management section 502 obtains a print file from the storage location indicated by the message of the cloud service server 131 and stores the print file in the print data DB 505. Meanwhile, the microblogging communications management section 502 notifies the print data management section 503 with a print job. If the request is not a print request for a follower, once again monitoring for a message of the cloud service server 131 is performed.

Next, the print data management section 503 sends the file stored in the print data DB 505 to the job processing section 504. With this the job processing section 504 carries out printing for the sent file and notifies the microblogging communications management section 502 to the effect that this has been done. Here, the screen display section 500 can display a screen for performing a print operation on the operation unit 219, and if necessary make a request for a change in image processing to the image processing section 506 based on an instruction from the user, and carry out a print job execution instruction to the job processing unit section. For example, this image processing section 506 receives requests for and processes changes in color processing and edge emphasis etcetera, and also screen change etcetera. The microblogging communications management section 502 notifies a user, that has been authenticated for the cloud service server 131, that the print was output. Here the text that notifies that the print data was output, is text that a person can understand such as, for example, "THE PRINT FOR MR. B HAS COMPLETED". Furthermore, the microblogging communications management section 502 manages messages sent.

Figure 6:
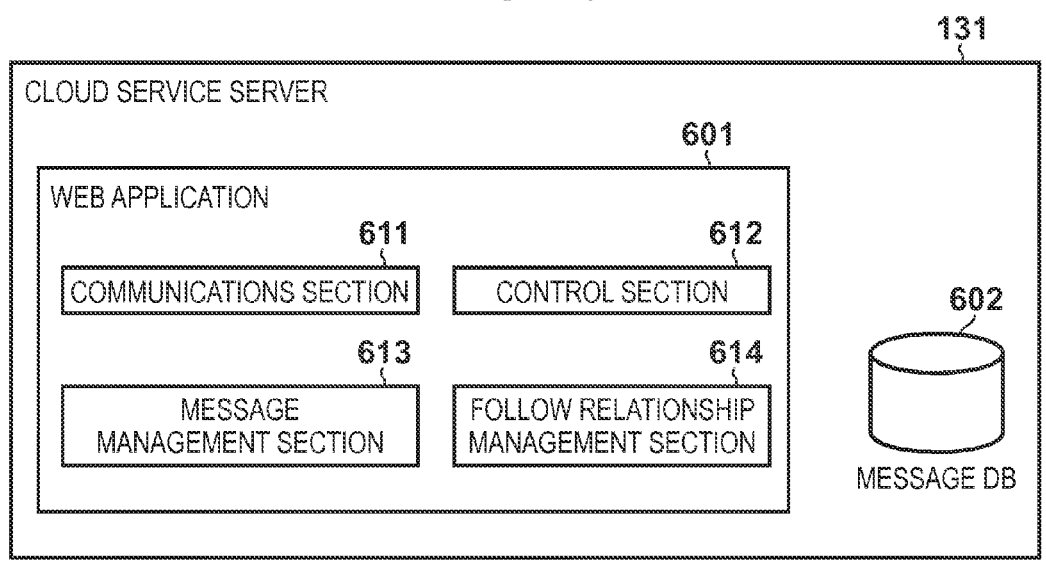
FIG. 6 is a diagram for describing a software configuration of the cloud service server according to the first embodiment of the present invention.

FIG. 6 is a diagram explaining a software configuration of the cloud service server 131 according to the first embodiment of the present invention. Each of the functional units shown in FIG. 6 is realized through the execution of control programs by the CPU 311 of the cloud service server 131.

The cloud service server 131 has a Web application 601 and a message database 602. (hereinafter referred to as the message DB 602) The Web application 601 is a Web application for providing such things as a CRM service. In the embodiment, the Web application 601 is providing a microblogging function. The Web application 601 has a communications section 611, a control section 612, a message management section 613, and a follow relationship management section 614.

The communication section 611 receives requests from the image forming apparatuses A 101 and B 103, and from the terminal 102 (PC, etcetera), and sends the request information to the control section 612. Furthermore, the communication section 611 receives a processing result from the control section 612, generates response data for that request, and sends the response to the image forming apparatus A 101, B 103, or the terminal 102. The control section 612 extracts a message or a comment included in the request according to the contents of the request that was sent from the communications section 611, and requests to the message management section 613 for registration processing of the message or the comment. The message management section 613 receives the message or the comment sent from the control section 612 and stores the message or the comment in the message DB 602. Furthermore, the message management section 613 based on a request from the control section 612, obtains a message or a comment that was registered in the message DB 602 and sends the message or the comment to the control section 612.

The follow relationship management section 614 manages relationships between a following side and a followed side. Specifically, in the case where a user B uses the terminal 102 (PC etcetera) and makes a request to follow the image forming apparatus B 103 to the communications section 611, the communications unit section adds the user B to the follower list of the image forming apparatus B 103 with the follow relationship management section 614. In this way the follow relationship is updated. The updating of a follow relationship has been explained, but the deletion of a follow relationship is performed in a similar procedure.

Figure 7:
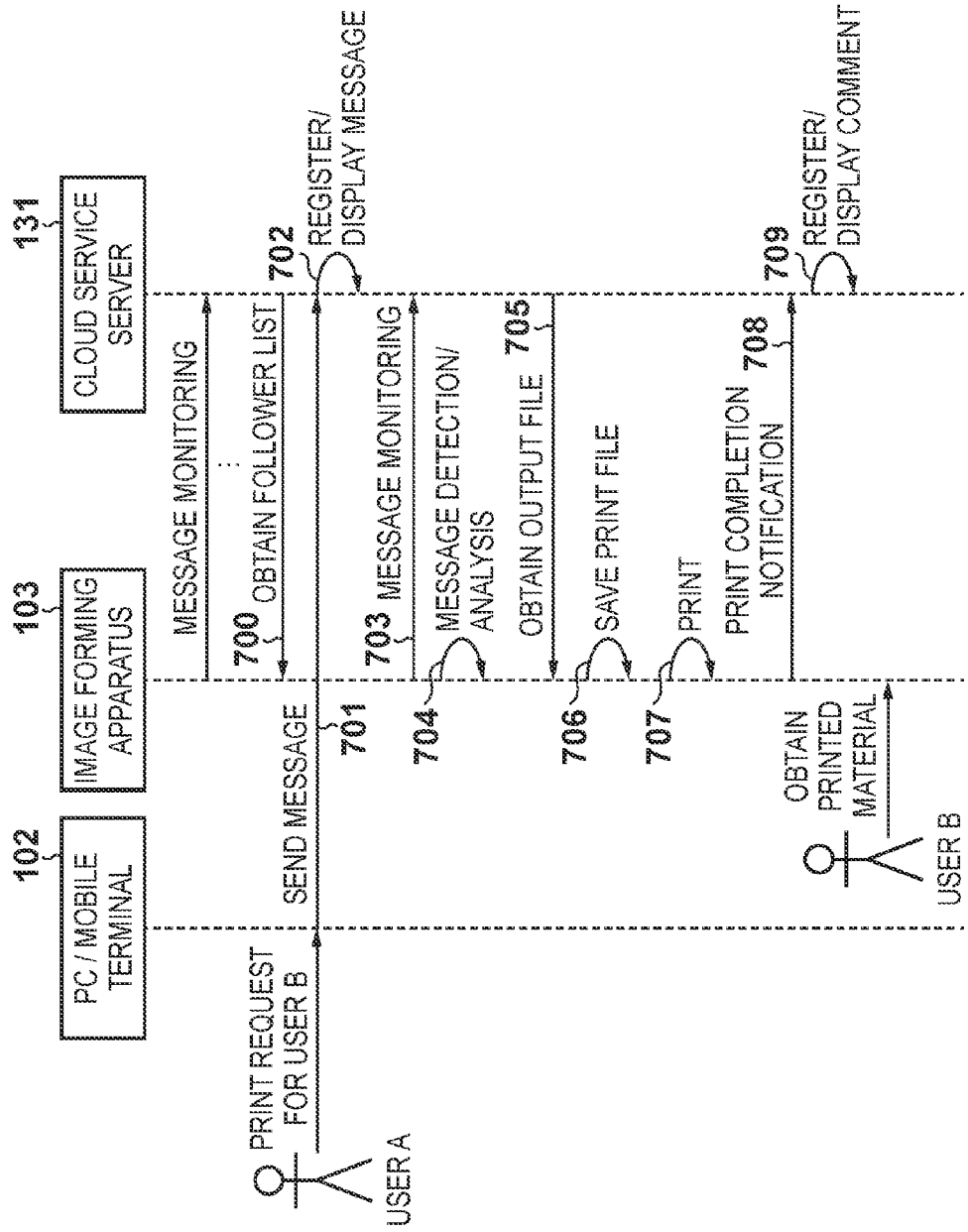
FIG. 7 is a sequence diagram for describing the operation of a processing series performed by an image forming apparatus B and the cloud service server according to the first embodiment of the present invention.

FIG. 7 is a sequence diagram for describing the operation of a processing series performed by the image forming apparatus B 103 and the cloud service server 131 according to the first embodiment of the present invention. A explanation of a detailed processing flowchart, for the image forming apparatus 103, will be given later referring to the flowchart.

In 700, the image forming apparatus B 103 obtains a follow list, that records follower information, from the cloud service server 131. In 701, a user A, using a Web browser of the terminal 102 (PC, etcetera) accesses the cloud service server 131 and sends a message to the effect of, "PLEASE PRINT 2 COPIES OF PROJECTYRESOURCEMANAGEMENT.XLS FOR MR. B". In 702, the cloud service server 131, having received the message sent by the user A, registers that message in the message DB 602.

The image forming apparatus B 103 monitors whether a message has been newly registered into the cloud service server 131. To do this, in 703, the image forming apparatus B 103 sends a request to the cloud service server 131 and checks whether there is a new message. The image forming apparatus B 103 regularly performs this check to see whether there is a new message. In 704, the image forming apparatus B 103 detects that there is a new message through the monitoring of 703 and analyzes the new message. The image forming apparatus B 103 analyzes the detected message that states, "PLEASE PRINT 2 COPIES OF PROJECTYRESOURCE-MANAGEMENT.XLS FOR MR. B". Here, the print instruction ("PLEASE PRINT"), information for the send destination ("MR. B"), information about the file to be sent ("PROJECTYRESOURCEMANAGEMENT.XLS"), the storage location of the file, and also information on the number to output ("2 COPIES") is obtained.

Next, in 705, the image forming apparatus B 103 obtains a file from the cloud service server 131 based on the result of the analysis. Here, the image forming apparatus B 103 obtains the file PROJECTYRESOURCEMANAGEMENT.XLS to be printed for user B. Next, in 706 the image forming apparatus B 103 saves the file obtained in 705 into the print data DB 505. Next, in 707, the image forming apparatus B 103, prints the file saved into the print data DB 505 in 706. Next, in 708, the image forming apparatus B 103, sends a comment to the effect that, "THE PRINT FOR MR. B COMPLETED" to the cloud service server 131. MR. B can then, having seen the comment that the print has completed, go to the location of the image forming apparatus B 103, and obtain the printed material.

Figures 8, 9:
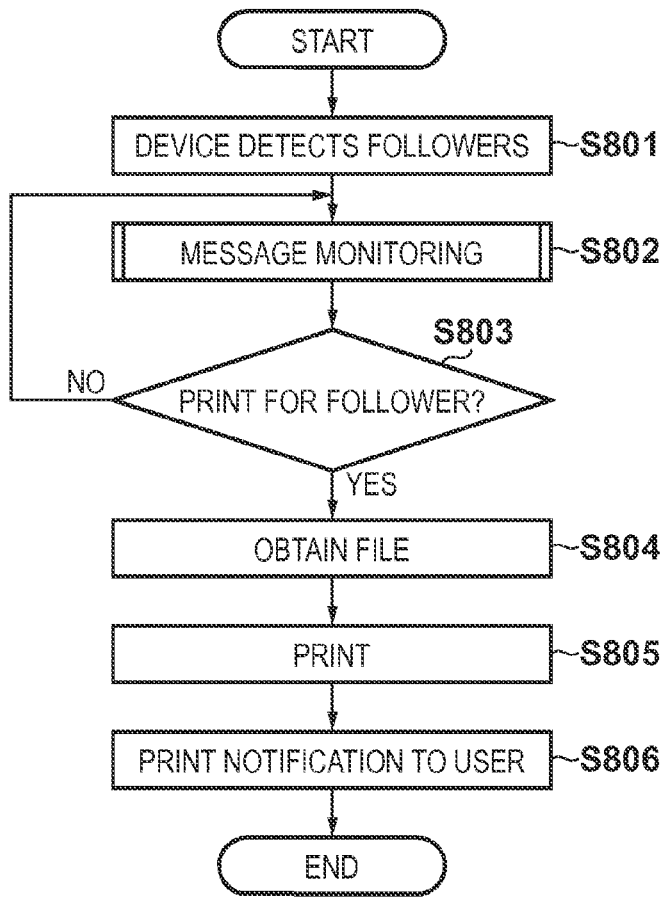
FIG. 8 is a flowchart for describing a processing series in the image forming apparatus B according to the first embodiment of the present invention.
FIG. 9 is a diagram for describing a print data management table that manages print data in a print data management section.

FIG. 8 is a flowchart for describing a processing series in the image forming apparatus B 103 according to the first embodiment of the present invention. The program that performs this processing is, for example, stored in the ROM 212, and executed under the control of the CPU 211.

First, in step S801, the image forming apparatus B 103 detects who is a follower by obtaining a follower list that is managed by the follow relationship management section 614 of the cloud service server 131. Next, the processing proceeds to step S802, and the image forming apparatus B 103, monitors for messages newly registered on the cloud service server 131. The method of monitoring is discussed later referring to FIG. 10.

Next, the processing proceeds to step S803, and the image forming apparatus B 103 determines whether a print request is a request to print for a follower based on the result of the monitoring, and if the result is that the print request is a request to print for a follower, the processing proceeds to step S804; otherwise, the processing proceeds to step S802. In step S804, the image forming apparatus B 103, based on the result of the analysis of step S803, obtains a file from the cloud service server 131. Next, the image forming apparatus B 103 saves the obtained file into the print data DB 505, and correspondingly registers in the print data management section 503.

FIG. 9 is a diagram for describing a print data management table that manages print data in the print data management section 503.

A print ID 901 is identifier information that uniquely identifies print data. In step S804, when the obtained file is saved into the print data DB 505, an ID that does not have a duplicate within the print data management table is generated for the print ID 901 and stored. Into a print name 902, a document name, in a string, that was obtained through the analysis in step S803 is stored. Furthermore, into a user ID 903, an ID from a user name that was obtained through the analysis in step S803 is stored.

Next, the processing proceeds to step S805, and the image forming apparatus B 103 executes a user job that is registered in the print data management section 503. Here, the print data management section 503 sends the file stored in the print data DB 505 to the job processing section 504. With this, the job processing section 504, based on the sent file, carries out the print. Next, the processing proceeds to step S806, and the job processing section 504 requests that a comment be sent to the microblogging communications management section 502. The microblogging communications management section 502, having received the request from the job processing section 504, generates a comment to the effect of, "THE PRINT FOR MR. B COMPLETED", and sends the comment sending request as well as the comment to the communications section 501.

FIG. 10 is a flowchart for describing the details of message monitoring processing (step S802) in the image forming apparatus B 103 according to the first embodiment of the present invention.

Firstly, in step S1001, the microblogging communications management section 502 obtains message list information via the communications section 501 from the cloud service server 131. Next, the processing proceeds to step S1002, and a determination is made whether a new message has been added. In the case where a new message does exist, the processing proceeds to step S1003, but in the case where a new message does not exist, the processing returns to step S1001, and checks are made regularly to see if a new message has been added. In step S1003, the new message obtained in step S1002 is analyzed, the sender's instruction in the message is determined and a subsequent stage of the processing is performed. The message analysis processing is discussed later referring to FIG. 11.

Next, the processing proceeds to step S1004, and it is determined whether the message analysis processing of step S1003 succeeded. In the case where the analysis processing succeeded, the processing concludes, and in the case where the analysis processing failed, the processing advances to step S1005. In step S1005, the microblogging communications management section 502 outputs an error log and the processing concludes.

Figure 11:
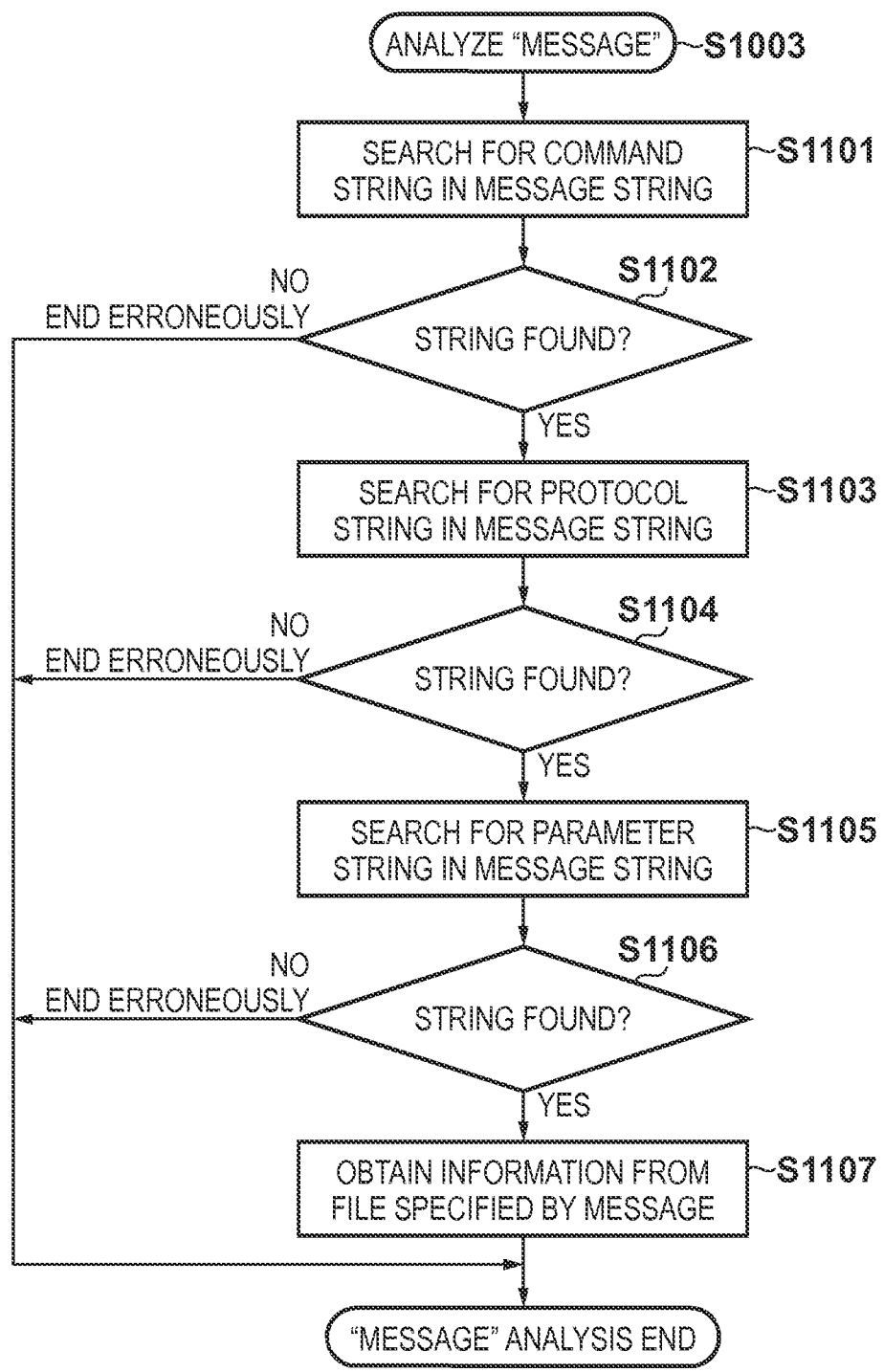
FIG. 11 is a flowchart for describing the details of comment analysis processing (S1003) in the image forming apparatus according to the first embodiment of the present invention.

FIG. 11 is a flowchart for describing the details of comment analysis processing (step S1003) in the image forming apparatus B 103 according to the first embodiment of the present invention. In this flowchart, the microblogging communications management section 502 analyzes a new message detected in step S1002. This message is described in the following kind of a format. Specifically, the message is, "PLEASE PRINT 2 COPIES OF PROJECTYRESOURCE-MANAGEMENT.XLS FOR MR. B.".

The microblogging communications management section 502 determines, from the above message, whether the print request is a print request for a follower, and if the print request is a print request for a follower, determines settings such as the file that the requester wishes to print, the storage location of the file, the number of copies, etcetera.

Firstly, in step S1101, the microblogging communications management section 502 searches for a command string in the command string management table shown in FIG. 12A.

FIGS. 12A-12C are diagrams for illustrating examples of a command string management table (FIG. 12A), a protocol string table (FIG. 12B), and a parameter string management table (FIG. 12C) held by an image forming apparatus.

Next, the processing proceeds to step S1102, and it is determined whether the command was found in step S1101 and processing is to continue. In the case where the string was found in step S1101, the processing proceeds to step S1103, and in the case where the string was not found, the processing cannot continue, and so the processing flow completes erroneously. In the case of the example message, because "PRINT" can be found, it is possible to determine that the processing function is a print function. In step S1103 the microblogging communications management section 502 searches for a protocol string of the protocol string management table of FIG. 12B, in the message string. Here, in the protocol string management table followers' names are saved.

Next, the processing proceeds to step S1104, and it is determined whether the searched string was found from the result of step S1103. In the case where the string was found in step S1103, the processing proceeds to step S1105, and in the case where the string was not found, the processing cannot continue, and so the processing flow completes erroneously. In the case of the example message, because "MR. B" can be found, it is possible to determine that the processing function is a print function for MR. B. In step S1105, the microblogging communications management section 502 searches for a parameter string of the parameter string management table of FIG. 12C, in the message string. Next, in step S1106, in the case where a string was found in S1105, the processing proceeds to step S1107, and in the case where a string was not found, the processing cannot continue, and so the processing flow completes erroneously. In the case of the example message, because "PROJECTYRESOURCEMANAGEMENT-.XLS", "2 COPIES", etcetera can be found, it is possible to determine that the processing function is to process printing "2 COPIES" of "PROJECTYRESOURCEMANAGE-MENT.XLS". Next, the processing proceeds to step S1107, and based on the above processing, a target file is identified, and information such as what location the file is stored at is obtained. Because of this, in the subsequent step S804 (FIG. 8), the file is obtained from the cloud service server 131, and can be printed in step S805.

As explained, according to the first embodiment, by the creation of a follow relationship by the user B with the image forming apparatus B 103, the user A, the print requester, need not know on what image forming apparatus B 103 the user B would like the print carried out on. Furthermore, because the user B need not send a print instruction, there is the effect of lowering the workload of both parties.

The Second Embodiment

In the previously described first embodiment, a premise is that a single user only follows one image forming apparatus, and if hypothetically, a user were to follow multiple image forming apparatuses, printing would be redundantly carried out by multiple image forming apparatuses. So, in the second embodiment, an explanation is given of an example in which even in the case where a single user follows multiple image forming apparatuses processing can be handled. Because the method of monitoring for messages and comments, and the method of analyzing is the same, these methods are not described.

Below, in the second embodiment, an explanation is made of a case in which a user B follows two image forming apparatuses, the image forming apparatus A 101 and the image forming apparatus B 103, and selects the image forming apparatus B 103 at print time.

Figure 13:
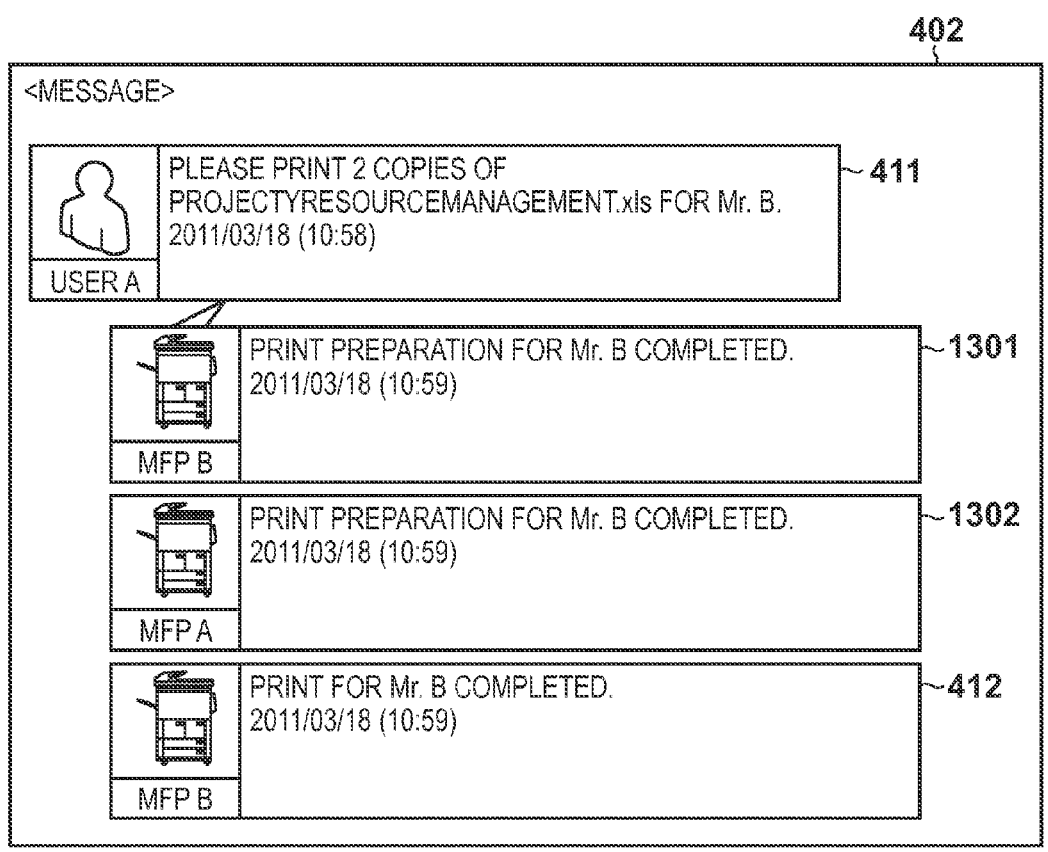
FIG. 13 is a diagram for describing a microblogging function provided on a cloud service server according to a second embodiment of the present invention.

FIG. 13 is a diagram explaining a microblogging function provided on the cloud service server 131 according to the second embodiment of the present invention, and only the parts that differ from FIG. 4 according to the first embodiment are taken up; parts that are common to FIG. 4 are shown with identical reference numerals.

In the message display area 402, a message 411, registered by a user A, that states, "PLEASE PRINT 2 COPIES OF PROJECTYRESOURCEMANAGEMENT.XLS FOR MR. B." is displayed. Also, in the message display area 402, in response to the message 411, a comment 1301 registered by the MFP B, that states, "PRINT PREPARATION FOR MR. B COMPLETED." and a comment 1302 registered by the MFP A, that states, "PRINT PREPARATION FOR MR. B COMPLETED." are displayed. Here, the MFP A refers to the image forming apparatus A 101. Furthermore, when a user B, having seen the display of these messages, selects the image forming apparatus B 103 from the image forming apparatuses A 101 and B 103, the image forming apparatus B 103 performs the print and also displays a comment 412 stating, "PRINT FOR MR. B COMPLETED".

Note, here the image forming apparatus A 101 can, in response to the comment of the image forming apparatus B 103 stating, "PRINT FOR MR. B COMPLETED.", cause "CANCELLING MFP A PRINT JOB BECAUSE PRINT FOR MR. B COMPLETED." to be displayed.

According to the second embodiment, the software configuration of the image forming apparatuses A 101 and B 103 is explained referring to previously discussed FIG. 5. As previously explained, the image forming apparatus A 101 and the image forming apparatus B 103 have the same configuration.

Each of the functional sections shown in FIG. 5 is realized through the execution of control programs by the CPUs 211 of the image forming apparatus A 101 and the image forming apparatus B 103. The communications section 501 sends requests to the cloud service server 131 according to an instruction from the microblogging communications management section 502. Furthermore, the communications section 501 receives a response from the cloud service server 131 (a response to the request). The microblogging communications management section 502 obtains follow information from the cloud service server 131. Next, the microblogging communications management section 502 monitors for messages of the cloud service server 131, and determines whether print requests are print requests for a follower. If a print request is a print request for a follower, the microblogging communications management section 502 obtains a print file from the storage location indicated by the message of the cloud service server 131 and stores the print data in the print data DB 505. Meanwhile, the microblogging communications management section 502 notifies the cloud service server 131 that print preparation for the user completed. Up until this point is performed on both the image forming apparatus A 101, and the image forming apparatus B 103.

Next the image forming apparatus B 103 will be discussed.

When the authentication information management section 507 detects user authentication information, it compares the user authentication information against the information in the authentication information DB 508 to check the user. Next, the authentication information management section 507 notifies the print data management section 503 with the user information, and the print data management section 503 sends the file stored in the print data DB 505 to the job processing section 504. On this, the job processing section 504 carries out printing based on the sent file and notifies the microblogging communications management section 502 to this effect. Here, the screen display section 500 displays a screen for performing print operations on the operation unit 219, and if necessary, with the instruction of a user, a request for an image processing change to the image processing section 506, and an instruction to perform a print job to the job processing section 504 may be carried out. For example, the image processing section 506 takes requests for and processes such things as color processing and edge emphasis changes, and also screen changes.

Next, the authentication information management section 507 with the microblogging communications management section 502 notifies the cloud service server 131 of the fact that a print for the user that was authenticated was carried out. Here, the text for notifying that the print data was output is text that a person can understand such as, for example, "PRINT FOR MR. B COMPLETED". Furthermore, the microblogging communications management section 502 carries out management of sent messages.

Next, the processing of the image forming apparatus A 101 is explained.

The microblogging communications management section 502 monitors for comments of the cloud service server 131 and also monitors whether a print for a follower has been output by another image forming apparatus. For example, the microblogging communications management section 502 analyzes the comment stating, "PRINT FOR MR. B COM-PLETED.", and interprets that a print has completed for user B. With this, the microblogging communications management section 502 notifies the print data management section 503 and the print data DB 505 of the result. Next the print data management section 503 cancels the print job for user B, and the print data DB 505 clears the print data stored for user B.

Figure 14:
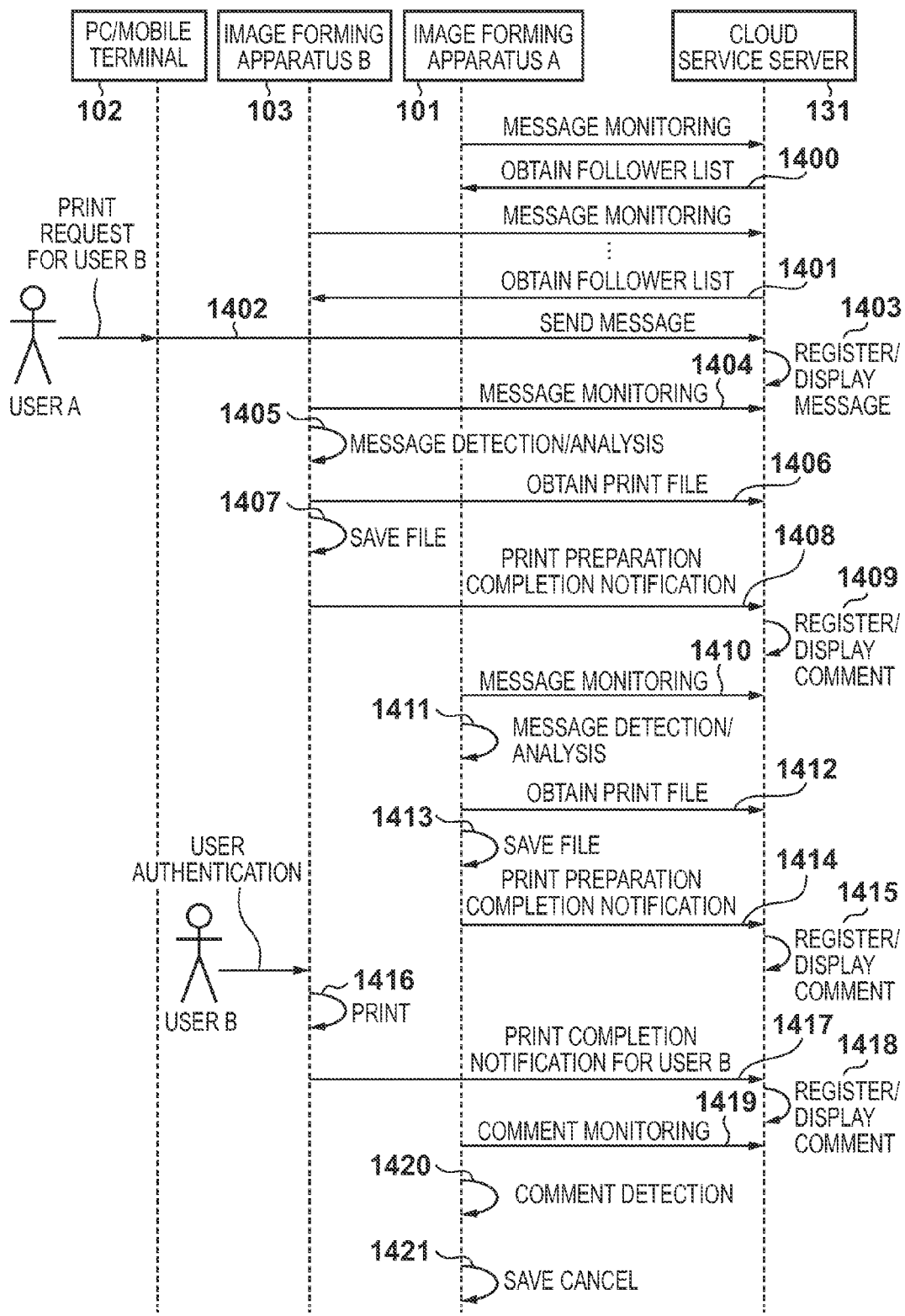
FIG. 14 is a sequence diagram for describing the operation of a processing series performed by an image forming apparatus A, an image forming apparatus B and the cloud service server according to the second embodiment of the present invention.

FIG. 14 is a sequence diagram for describing the operation of a processing series performed by the image forming apparatus A 101, the image forming apparatus B 103 and the cloud service server 131 according to the second embodiment of the present invention. Furthermore, regarding image forming apparatuses, here there are 2 (the image forming apparatus A 101 and the image forming apparatus B 103), both of which are apparatuses with the same configuration.

In 1400, the image forming apparatus A 101 obtains a follower list, in which follower information is recorded, from the cloud service server 131. In 1401, the image forming apparatus B 103 obtains a follower list, in which follower information is recorded, from the cloud service server 131. In 1402, a user A, using a Web browser of the terminal 102 (PC, etcetera), accesses the cloud service server 131 and sends a message stating, "PLEASE PRINT 2 COPIES OF PROJECTYRESOURCEMANAGEMENT.XLS FOR MR. B.". In 1403, the cloud service server 131, having received the message sent by the user A, registers the message into the message DB 602.

Next, the image forming apparatus B 103 monitors whether a new message was added to the cloud service server 131. To do this, in 1404, the image forming apparatus B 103 sends a request and checks whether there is a new message on the cloud service server 131. The image forming apparatus B 103 regularly performs a check of whether there is a new message. Next in 1405 the image forming apparatus B 103 detects that there is a new message through the message monitoring of 1404, and analyzes the message. The image forming apparatus B 103 obtains the detected comment, "PLEASE PRINT 2 COPIES OF PROJECTYRESOURCE-MANAGEMENT.XLS FOR MR. B.", and analyzes it. Here, the print instruction ("PLEASE PRINT"), information for the send destination ("MR. B"), information about the file to be sent ("PROJECTYRESOURCEMANAGEMENT.XLS") the storage location of the file, and also information on the number to output ("2 COPIES") is obtained.

Next, in 1406, the image forming apparatus B 103 obtains a file from the cloud service server 131 based on the result of the analysis. Here, the image forming apparatus B 103 obtains the file PROJECTYRESOURCEMANAGE-MENT.XLS to be printed for a user B. Next, in 1407, the image forming apparatus B 103 saves the obtained file into the print data DB 505 in conjunction with recording the file in the print data management section 503. Next, in 1408, the image forming apparatus B 103, sends a comment to the effect of, "THE PRINT FOR MR. B COMPLETED" to the cloud service server 131. With this, in 1409, the cloud service server 131, having received the comment sent by the image forming apparatus B 103, records the comment into the message DB 602.

Meanwhile, the image forming apparatus A 101 carries out the same processing. Specifically, in 1410, the image forming apparatus A 101 monitors whether a new message has been added to the cloud service server 131. To do this, in 1410, the image forming apparatus A 101 sends a request, and checks whether there is an added message on the cloud service server 131. The image forming apparatus A 101 regularly performs a check of whether there is an added message. In 1411, the image forming apparatus A 101 detects through the message monitoring of 1410 that there is a new message and analyzes the message. The image forming apparatus A 101 obtains and analyzes the detected comment stating, "PLEASE PRINT 2 COPIES OF PROJECTYRESOURCEMANAGEMENT.XLS FOR MR. B.". The print instruction ("PLEASE PRINT"), information for who to send to ("MR. B"), information about the file to be sent ("PROJECTYRESOURCEMANAGEMENT.XLS") the storage location of the file, and also information on the number to output ("2 COPIES") is obtained.

Next, in 1412, the image forming apparatus A 101 obtains the file from the cloud service server 131 based on the analysis result. Here, the image forming apparatus A 101 obtains the file PROJECTYRESOURCEMANAGEMENT.XLS to be printed for the user B. Next, in 1413, the image forming apparatus A 101 saves the obtained file into the print data DB 505 in conjunction with recording the file in the print data management section 503. Next, in 1414, the image forming apparatus A 101, sends a comment to the cloud service server 131 to the effect of, "PRINT PREPARATION FOR MR. B COMPLETED". In 1415, the cloud service server 131, having received the comment sent from the image forming apparatus A 101, registers the comment into the message DB 602.

Next, an example of the case where the user B selects the image forming apparatus B 103 is explained.

In 1416, the user B, having seen "PRINT PREPARATION FOR MR. B COMPLETED", goes to the location of the image forming apparatus B 103, and carries out user authentication. As a result of that, the job processing section 504 of the image forming apparatus B 103 carries out the print. Here, the authentication information management section 507 compares the authentication information of the user B against the authentication information DB 508 to check the user B, and after the check, performs the job for the user B that is registered in the print data management section 503. The print processing for user B is carried out with the processing explained above.

In 1417, the image forming apparatus B 103 sends a comment to the effect of, "PRINT FOR MR. B COMPLETED", to the cloud service server 131. In 1418, the cloud service server 131, having received the comment sent from the image forming apparatus B 103, registers the comment into the message DB 602. In 1419, the image forming apparatus A 101 monitors whether a new comment has been added to the cloud service server 131. In 1420, the image forming apparatus A 101 detects, with the monitoring of 1419, that there is a new message and analyzes the message. The image forming apparatus A 101 obtains and analyzes the detected comment stating, "PRINT PREPARATION FOR MR. B COMPLETED". From the print instruction ("PRINT"), information for the user printed for ("MR. B"), and information for the print completion comment ("COMPLETED"), it is confirmed that the print for the user B has completed. Next, in 1421, the image forming apparatus A 101 cancels the print job for the user B.

Figure 15:
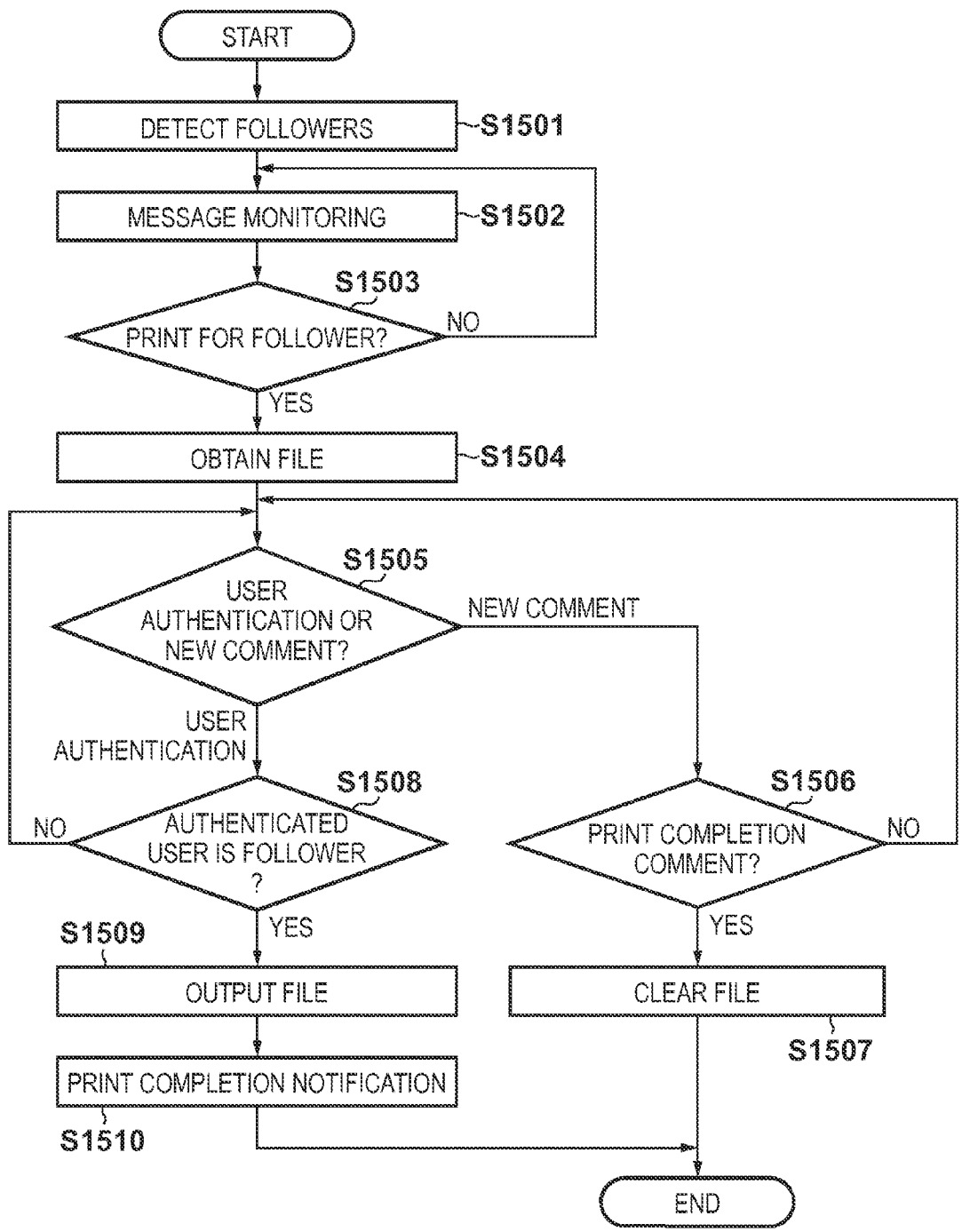
FIG. 15 is a flowchart for describing the operation of a processing series performed by the image forming apparatus A and the image forming apparatus B according to the second embodiment of the present invention.

FIG. 15 is a flowchart for describing the operation of a processing series performed by the image forming apparatus A 101 and the image forming apparatus B 103 according to the second embodiment of the present invention. Hereinafter, the image forming apparatus A 101 and the image forming apparatus B 103 are put together and described as the image forming apparatus 101.

Firstly, in step S1501, the image forming apparatus 101, by obtaining the follow list managed by the follow relationship management section 614 of the cloud service server 131, detects who is a follower. Next, the processing proceeds to step S1502, and the image forming apparatus 101 monitors for messages newly recorded on the cloud service server 131.

In step S1503, the image forming apparatus 101 determines whether a print request is a request for a follower, and if the result is that the print request is a request for the follower, the processing proceeds to step S1504; otherwise step 1502 is once again carried out. In step 1504, the image forming apparatus 101 obtains a file from the cloud service server 131 based on the result of analysis. Next, the image forming apparatus 101 saves the obtained file into the print data DB 505 in conjunction with registering the file in the print data management section 503. Furthermore, the microblogging communications management section 502 of the image forming apparatus 101 notifies the cloud service server 131 of the fact that the print preparation for the authenticated user could be completed.

In step S1505, the image forming apparatus 101 monitors whether user authentication was carried out, and whether a new comment was added. In the case where user authentication was done, the processing proceeds to step S1508 and if a new comment was added, the processing proceeds to step S1506. In step S1506, the image forming apparatus 101 determines if the comment is a comment for the completion of a print for the follower, and if not, the processing proceeds to step S1505. On the other hand in the case that the comment is a comment for the completion of a print for a follower, the processing proceeds to step S1507. Here, a comment for the completion of a print for the follower is, for example, "PRINT FOR MR. B COMPLETED". In step S1507, the image forming apparatus 101 determines if the follower output the print on another image forming apparatus, clears the file saved in step S1504, cancels the job and finishes processing. In the example of FIG. 14, the processing of step S1506 and step S1507 is performed on the image forming apparatus A 101.

Meanwhile in step S1508, the image forming apparatus 101 determines whether the authenticated user is the follower, and if so the processing proceeds to step S1509; if not the processing proceeds to step S1505. In step S1509, the image forming apparatus 101 determines that the print is for the follower and prints the file saved in step S1504. Next the processing proceeds to step S1510, and the image forming apparatus 101, notifies the cloud service server 131 with a comment that shows that the print for the authenticated user completed stating, "PRINT FOR MR. B COMPLETED". In the example in FIG. 14, steps S1508 through S1510 are carried out on the image forming apparatus B 103.

As explained above, according to the second embodiment, the user B, having had a print requested for the user B, can obtain the printed material if, when the user B wants the print material, the user B goes to the to the location of the image forming apparatus B 103 that the user B requested to print. Furthermore the user B, having had a print requested for the user B, can cause the image forming apparatus B 103 that the user B follows and that is closest to the user B to print.

Furthermore, as another effect, if the user B, having had a print requested for the user B, goes to the location of the location of the image forming apparatus B that the user B is following, the user B can obtain the print material at the user B's convenience. Because of this, not noticing a print, and having one's own print materials taken by someone else, etcetera, can be avoided.

Note, in the second embodiment, the image forming apparatus B 103 performs the print as soon as the it obtains the file and confirms the user B, and the image forming apparatus A 101, detecting the print completion of the image forming apparatus B 103, must clear the file. Here, the image forming apparatus A 101 and the image forming apparatus B 103 may obtain the file from the cloud service server 131 and print after checking the user.

Specifically, adding further explanation to the second embodiment, when the image forming apparatus B 103 confirms the user B, it obtains the file from the cloud service server 131 and prints. On the other hand, if there is no print instruction within a set period of time, the image forming apparatus B 103 clears the job itself. Because of this, the image forming apparatus A 101 needs not perform processing to clear the file after detecting the completion of print by the image forming apparatus B 103.

The Third Embodiment

In previously explained first and second embodiments, the user B is in a following relationship with at least one image forming apparatus 101. Here, the case where not even one is followed, the case where the followed image forming apparatus 101 is in an inoperable state, etcetera are explained. Here, a user A shall be considered to be following the image forming apparatus A 101. After monitoring for a comment on a message for a print request for the user A, if there is no comment after a set amount of time has passed, the solution is that printing will be done by the image forming apparatus A 101 that the user A follows. In the third embodiment, as in the second embodiment, only differing parts from the previous embodiments will be explained.

Figure 16:
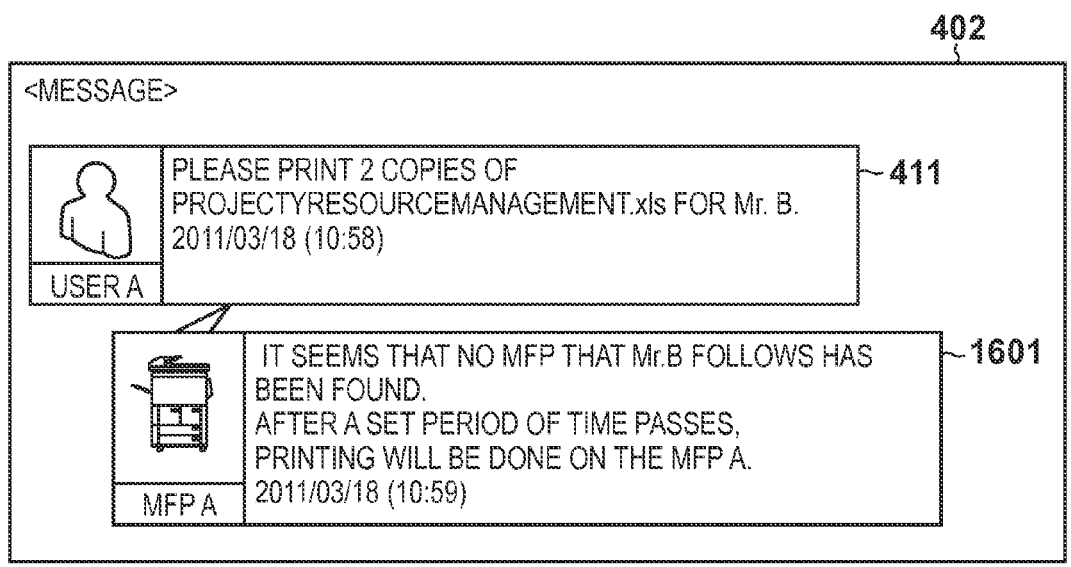
FIG. 16 is a diagram for describing a microblogging function provided on a cloud service server according to a third embodiment of the present invention.

FIG. 16 is a diagram for describing a microblogging function provided on the cloud service server 131 according to the third embodiment of the present invention, and only parts differing from FIG. 4 according to the first embodiment are taken up; parts common to FIG. 4 are shown with the same reference numerals.

In the message display area 402, a message 411, registered by a user A, that states, "PLEASE PRINT 2 COPIES OF PROJECTYRESOURCEMANAGEMENT.XLS FOR MR. B.". In response to this message 411, the image forming apparatus A 101 that the user A follows, monitors whether there is a comment for a set period of time. For example, the image forming apparatus A 101 waits for comments such as "PRINT PREPARATION FOR MR. B COMPLETED." and "PRINT FOR MR. B COMPLETED". However, in the case where there was no such comment, the image forming apparatus A 101 registers a comment for a user B. For example, the image forming apparatus A 101 registers a comment stating, "IT SEEMS THAT NO MFP THAT MR. B FOLLOWS HAS BEEN FOUND. AFTER A SET PERIOD OF TIME PASSES, PRINTING WILL BE DONE ON THE MFP A". Below, the case in which print is done on the image forming apparatus A 101 when the user B did nothing in response to a comment requesting the user B to follow an image forming apparatus is explained.

Referring to previously discussed FIG. 5, the software configuration of the image forming apparatus A 101 according to the third embodiment will be explained. Each of the functional units shown in FIG. 5 is realized through the execution of control programs by the CPUs 211 of each of the image forming apparatuses 101.

The communications section 501 sends requests to the cloud service server 131 upon an instruction from the microblogging communications management section 502. Furthermore, the communications section 501 receives a response from the cloud service server 131 (a response to the request). The microblogging communications management section 502 obtains follow information from the cloud service server 131. Next, the microblogging communications management section 502 monitors for messages, and determines whether a follower (user A) is requesting a print. If a follower (user A) is requesting a print for another user (user B), monitoring for comments from any other image forming apparatuses 101 (B 103) that a user B may be following is performed. This comment is, for example, "Print preparation for user B completed", etcetera. If this kind of comment is detected, the image forming apparatus A 101 that the user A is following completes the processing without doing anything.

However, in the case where this kind of comment was not detected in the set period of time, it is determined that another image forming apparatus B 103 that the user B may be following is not be able to print for some reason. So, the image forming apparatus A 101, that is followed by the print requester, the user A, carries out the print instead. Specifically, the microblogging communications management section 502 of the image forming apparatus A 101 obtains the print file from the storage location specified in the message of the cloud service server 131 and stores the file in the print data DB 505. Meanwhile, the microblogging communications management section 502 notifies the cloud service server 131 that print preparation for the user completed. For example, this notification is a comment such as, "IT SEEMS THAT NO MFP THAT MR. B FOLLOWS HAS BEEN FOUND. AFTER A SET PERIOD OF TIME PASSES, PRINTING WILL BE DONE ON THE MFP A" (1601).

Next, the microblogging communications management section 502 of the image forming apparatus A 101 notifies the print data management section 503 of the print job. Next, the print data management section 503 sends the file stored in the print data DB 505 to the job processing section 504. With this, the job processing section 504 carries out the print based on the sent file, and notifies the microblogging communications management section 502 to that effect. Next, the microblogging communications management section 502 notifies that the print for the user B has completed. The text used to notify that the print has completed here is, for example, text that a person can understand such as, "PRINT FOR MR. B COMPLETED". Furthermore, the microblogging communications management section 502 carries out management of sent messages.

Figure 18:
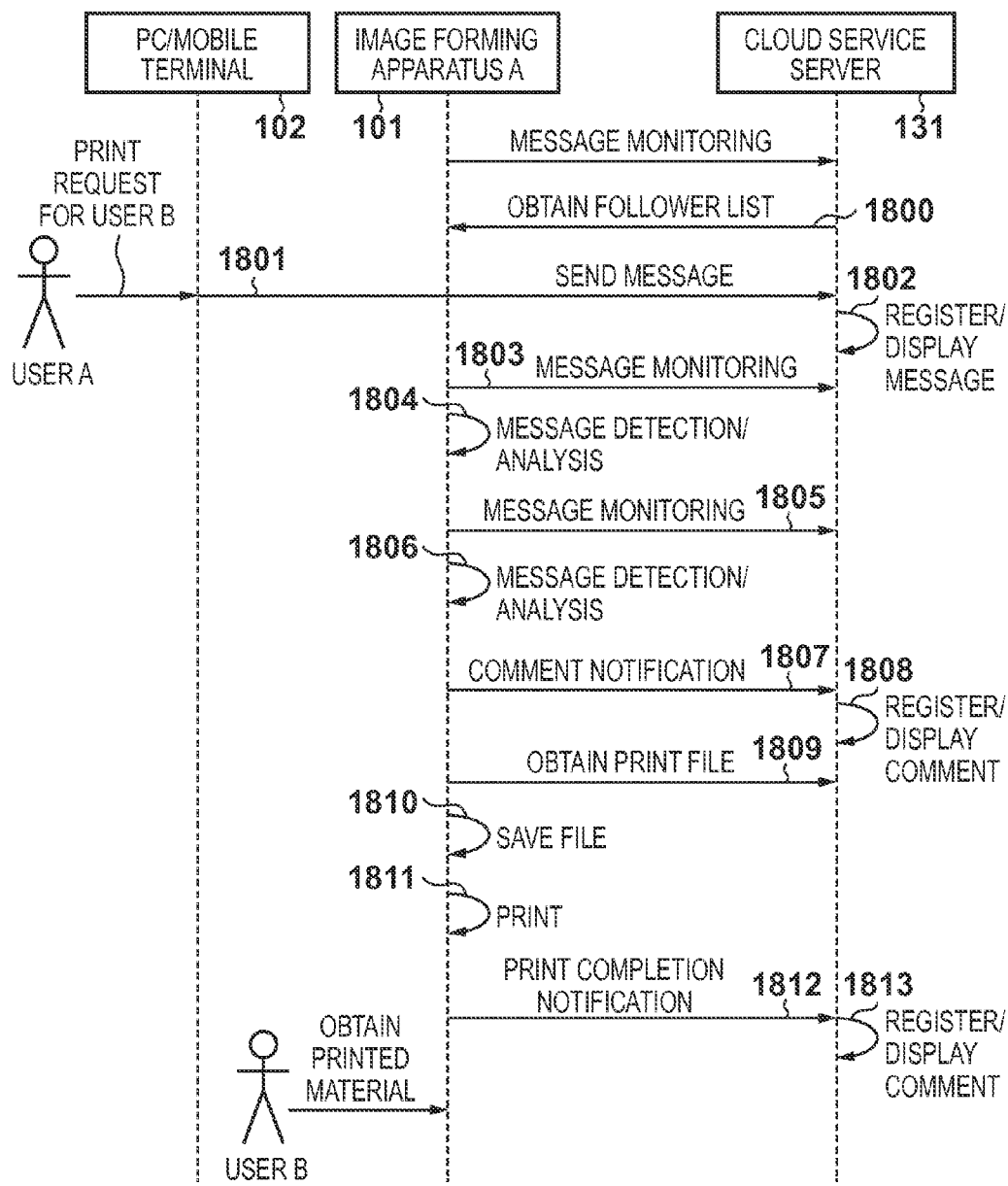
FIG. 18 is a sequence diagram for describing the operation of a processing series performed by the image forming apparatus A and the cloud service server according to the third embodiment of the present invention.

FIG. 18 is a sequence diagram for describing the operation of a processing series performed by the image forming apparatus A 101 and the cloud service server 131 according to the third embodiment of the present invention.

In 1800, the image forming apparatus A 101 obtains a follower list in which follower information is recorded from the cloud service server 131. In 1801, the user A uses a Web browser on the terminal 102 (PC, etcetera) to access the cloud service server and sends a messages to the effect of, "PLEASE PRINT 2 COPIES OF PROJECTYRESOURCEMANAGEMENT.XLS FOR MR. B.". In 1802, the cloud service server 131, having received the message sent by the user A, registers the message into the message DB 602.

Here, the image forming apparatus A 101 monitors whether a newly registered message was added to the cloud service server 131. To do that, in 1803, the image forming apparatus A 101 sends a request and checks whether there is a new message on the cloud service server 131. The image forming apparatus A 101 regularly performs this check of whether there is a new message.

In 1804, due to the message monitoring of 1803, the image forming apparatus A 101 detects that there is a new message, and analyzes the message. The image forming apparatus A 101 obtains the detected message, "PLEASE PRINT 2 COPIES OF PROJECTYRESOURCEMANAGEMENT.XLS FOR MR. B.", and analyzes the message. The print instruction ("PLEASE PRINT"), information for the send destination ("MR. B"), information about the file to be sent ("PROJECTYRESOURCEMANAGEMENT.XLS") the storage location of the file, and also information on the number to output ("2 COPIES") is obtained.

Next, in 1805, the image forming apparatus A 101 monitors for comments from the image forming apparatuses B 103 that the user B may be following. In 1806, the image forming apparatus A 101 determines whether there is a comment. In 1807, when it is determined that even though a set time period has elapsed, there is no comment in 1806, it is determined that there is no image forming apparatuses that the user B follows, or that for some reason the image forming apparatuses B 103 that the user B follows do not operate. Next, a message to the effect that the print will be done on the image forming apparatus A 101 is sent to the cloud service center 131.

In 1808, the cloud service server 131 receives the message sent from the image forming apparatus A 101, and registers the message into the message DB 602. Next, in 1809, the image forming apparatus A 101 requests and obtains the file from the cloud service server 131. Here, the image forming apparatus A 101 obtains, PROJECTYRESOURCEMANAGEMENT.XLS, the file to print for the user B. Next, in 1810, the image forming apparatus A 101, saves the obtained file to the print data DB 505 in conjunction with recording the file in the print data management section 503. In 1811, the image forming apparatus A 101 performs, for the user B, the print job that is recorded in the print data management section 503. In this way the processing of the print for the user B is carried out. In 1812, the image forming apparatus A 101 sends a comment to the cloud service server 131 stating something to the effect of "PRINT FOR MR. B COMPLETED". Next, in 1813, the cloud service server 131 receives the comment sent from the image forming apparatus A 101, and registers that comment into the message DB 602.

Figure 17:
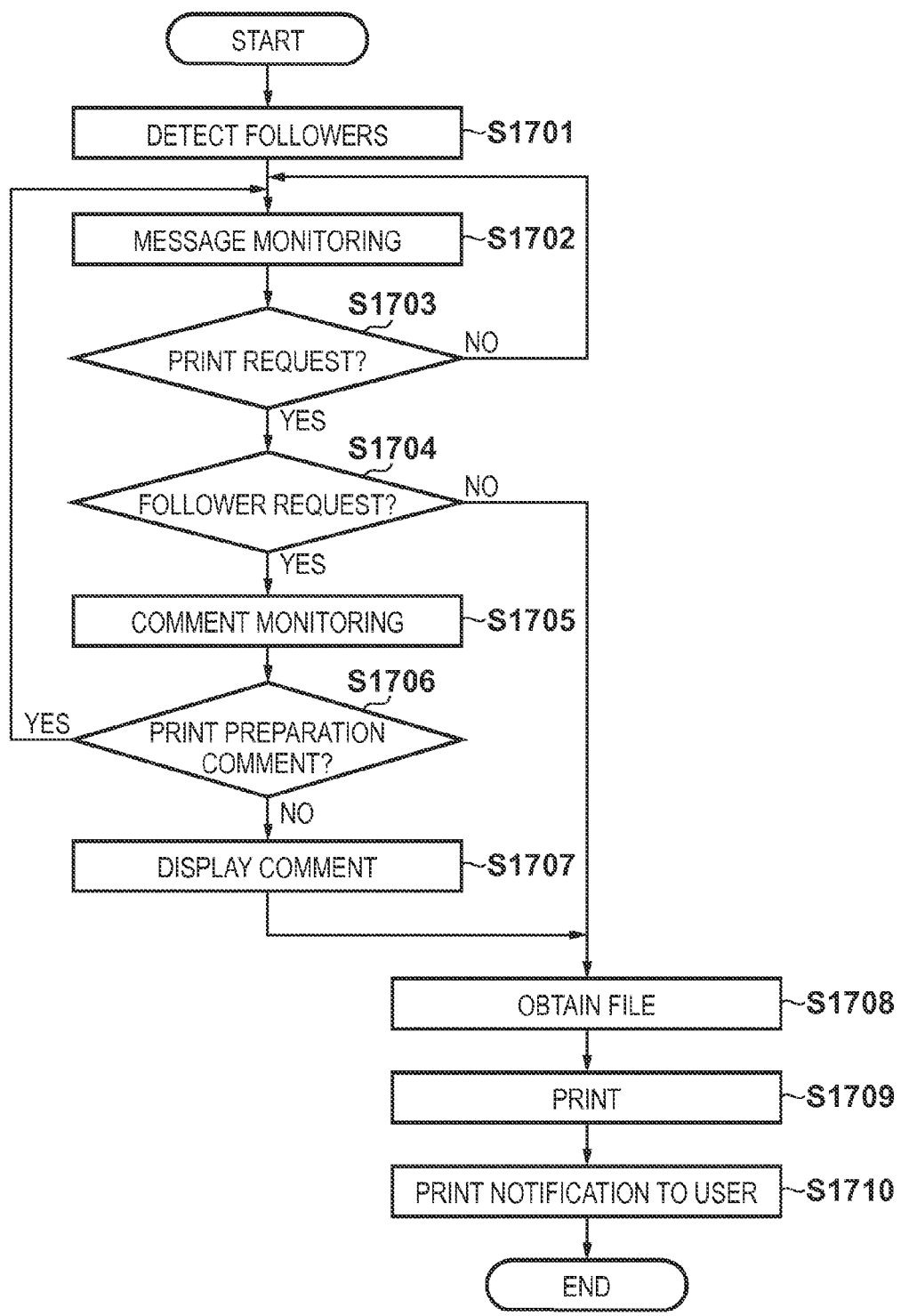
FIG. 17 is a flowchart for describing the operation of a processing series performed by an image forming apparatus A according to the third embodiment of the present invention.

FIG. 17 is a flowchart for describing the operation of a processing series performed by the image forming apparatus A 101 according to the third embodiment of the present invention.

In step S1701, the image forming apparatus A 101, by obtaining the follower list managed by the follower relationship management section 614 of the cloud service server 131, detects who is a follower. Next, the processing proceeds to step S1702, and the image forming apparatus A 101 monitors for messages newly registered. In step S1703, the image forming apparatus A 101, based on the results of the monitoring, determines whether a request is related to a print request, and if the request is related to a print request, the processing proceeds to step S1704; if not the processing proceeds to step 1702. In step S1704, the image forming apparatus A 101 determines if the request is a message requested by a follower. If the request is a message requested by the follower, the processing proceeds to step S1705; if not, the processing proceeds to step S1708. Here, as in the previously described first and second embodiments, analysis of the message is carried out, and it is analyzed what file is desired to be printed and in what format is the print to be done.

In step S1705, the image forming apparatus A 101 monitors for comments from the image forming apparatuses B 103 that the user B may be following. Next, the processing proceeds to step S1706, and the image forming apparatus A 101 analyzes the comment, and determines whether the comment is a comment for the completion of print preparation from the image forming apparatus B 103. For example, this comment may be, "PRINT PREPARATION FOR MR. B COMPLETED". Here, there is a comment for the completion of print preparation, the processing proceeds to step S1702, and the next print request is monitored for.

On the other hand, when there is no comment for the completion of print preparation, the processing proceeds to step S1707. The determination of whether there is this kind of comment is, for example, a determination of whether there is a comment within a predefined time period. In step S1707, the image forming apparatus A 101 notifies the cloud service server 131 with a comment and the processing proceeds to step S1708. For example, the comment states, "IT SEEMS THAT NO MFP THAT MR. B FOLLOWS HAS BEEN FOUND. AFTER A SET PERIOD OF TIME PASSES, PRINTING WILL BE DONE ON THE MFP A" (the image forming apparatus A 101).

Next, an example will be described for the case where the user B does not follow the MFP B.

In step S1708, the image forming apparatus A 101 obtains a file based on the analysis result of step S1704 from the cloud service server 131. Next, the image forming apparatus A 101 saves the obtained file into the print data DB 505 in conjunction with registering the file in the print data management section 503. Next, in step S1709, the image forming apparatus A 101, sends the file stored in the print data DB 505 to the job processing section 504, and the job processing unit section carries out the print based on the sent file. Next, the processing proceeds to step S1710, and the image forming apparatus A 101 notifies the cloud service server 131 with a message stating, "PRINT FOR MR. B COMPLETED".

As explained, according to the third embodiment, when the user A has requested a print for the user B, it is possible for the print instead to be carried out on the image forming apparatus A 101 that the user A follows when the user B is not following the image forming apparatus B 103. Because of this a situation where the requested print is not carried out can be avoided.

Furthermore, by the image forming apparatus that the user that requested a print for another user follows monitoring the state of the image forming apparatuses that the other user follows using comments on a microblogging function, various things become possible. For example, in the third embodiment, the image forming apparatus A 101 does the print instead, but it is also possible for the image forming apparatus A 101 to encourage the user B to follow an optimal image forming apparatus for the user B, and to get the user B to specify the optimal image forming apparatus for the user B.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-032037, filed Feb. 16, 2012, which is hereby incorporated by reference herein in its entirety.

What is claimed is:

1. An image forming apparatus capable of communicating with a Web service apparatus having a microblogging function, the image forming apparatus comprising:
a receiving unit configured to receive a message registered in the Web service apparatus;
a determining unit configured to analyze contents of the message received by the receiving unit and determine whether the message includes an instruction to print for a follower that follows the image forming apparatus;
an obtaining unit configured to obtain a file from the Web service apparatus when the determining unit determines that the message includes the instruction to print for the follower;
a printing unit configured to carry out a printing of the file obtained by the obtaining unit; and
a communicating unit configured to send a comment related to the printing to the Web service apparatus after the printing by the printing unit finishes.

2. The image forming apparatus according to claim 1, wherein the printing unit carries out the printing of the file obtained by the obtaining unit in a case where an authentication of the follower is successful.

3. The image forming apparatus according to claim 1 further comprising:
a unit configured to, after the obtaining unit obtains the file, search for a comment registered in the Web service apparatus and obtain the comment;
a clearing unit configured to clear the file that the obtaining unit obtained, in a case where the comment indicates that the printing for the follower completed.

4. A non-transitory computer-readable storage medium storing a program for causing a computer to function as an image forming apparatus defined in claim 1.

5. An image forming apparatus capable of communicating with a Web service apparatus having a microblogging function, the image forming apparatus comprising:
a receiving unit configured to receive a message registered in the Web service apparatus;
a determining unit configured to analyze the contents of the message received by the receiving unit and determine whether the message includes an instruction to print for a follower that follows another image forming apparatus;
a distinguishing unit configured to distinguish, in a case when the determining unit determined that the message includes the instruction to print for the follower that follows another image forming apparatus, whether there is a comment from the another image forming apparatus which performs a print processing based on the instruction to print;
an obtaining unit configured to obtain a file from the Web service apparatus in a case where the distinguishing unit could not distinguish that there is the comment within a predetermined time period;
a printing unit configured to carry out a printing of the file obtained by the obtaining unit; and
a communicating unit configured to send a comment related to the printing to the Web service apparatus after the printing by the printing unit finishes.

6. The image forming apparatus according claim 5, wherein:
the message at least includes a print instruction, send destination information, information about the file to be sent, the storage location of the file, and information on a number of copies to output.

7. A control method for controlling an image forming apparatus capable of communicating with a Web service apparatus having a microblogging function, the control method comprising:
a receiving step of receiving a message registered in the Web service apparatus;
a determining step of analyzing contents of the message received in the receiving step and determining whether the message includes an instruction to print for a follower that follows the image forming apparatus;
an obtaining step of obtaining a file from the Web service apparatus when in the determining step it is determined that the message includes the instruction to print for the follower;
a printing step of a printing unit carrying out a printing of the file obtained in the obtaining step; and
a communicating step of a communicating unit sending a comment related to the printing to the Web service apparatus after the printing of the printing step finishes.

8. The control method according to claim 7, wherein in the printing step the printing of the file obtained in the obtaining step is carried out in a case where an authentication of the follower is successful.

9. The control method according to claim 7, further comprising:
a step of, after obtaining the file in the obtaining step, searching for a comment registered in the Web service apparatus and obtaining the comment;
a clearing step of clearing the file, obtained in the obtaining step, in a case where the comment indicates that the printing for the follower completed.

10. A control method for controlling an image forming apparatus capable of communicating with a Web service apparatus having a microblogging function, the control method comprising:
a receiving step of receiving a message registered in the Web service apparatus;
a determining step of analyzing contents of the message received in the receiving step and determining whether the message includes an instruction to print for a follower that follows another image forming apparatus;
a distinguishing step of distinguishing, in a case when in the determining step it was determined that the message includes the instruction to print for the follower that follows another image forming apparatus, whether there is a comment from the another image forming apparatus which performs a print processing based on the instruction to print;
an obtaining step of obtaining a file from the Web service apparatus in a case where in the distinguishing step it could not be distinguished that there is the comment within a predetermined time period;
a printing step of carrying out a printing of the file obtained in the obtaining step; and
a communicating step of sending a comment related to the printing to the Web service apparatus after the printing in the printing step finishes.

11. The control method according claim 10, wherein:
the message at least includes a print instruction, send destination information, information about the file to be sent, the storage location of the file, and information on a number of copies to output.

* * * * *